July 4, 1933.  R. GOOD  1,916,262
METHOD AND APPARATUS FOR FEEDING BATCH MIXTURES TO FURNACES
Filed April 12, 1928  2 Sheets-Sheet 1

Inventor
Robert Good.
By Eccleston & Eccleston,
Attorneys

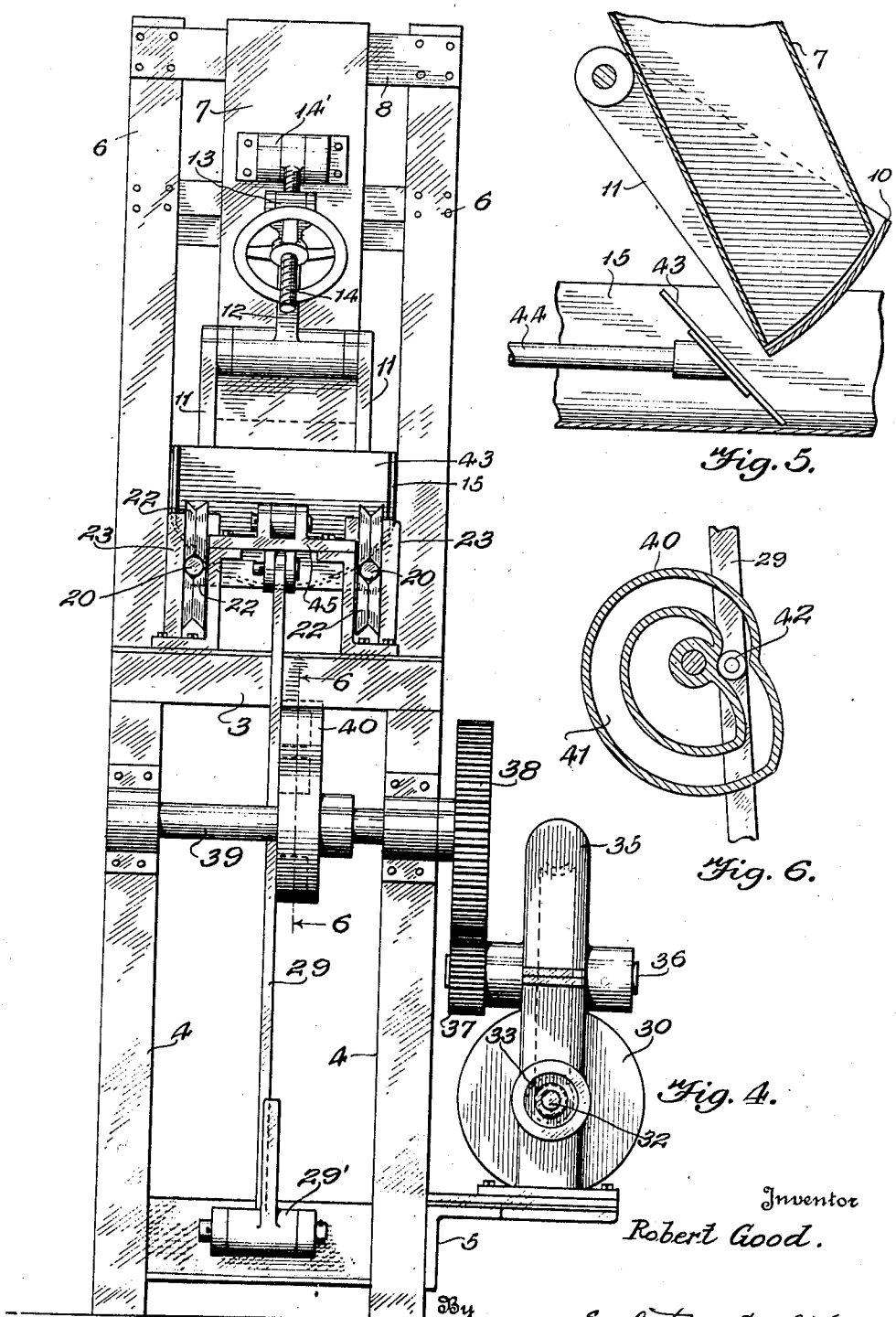

Patented July 4, 1933

1,916,262

UNITED STATES PATENT OFFICE

ROBERT GOOD, OF WASHINGTON, PENNSYLVANIA, ASSIGNOR TO HAZEL-ATLAS GLASS CO., OF WHEELING, WEST VIRGINIA, A CORPORATION OF WEST VIRGINIA

METHOD AND APPARATUS FOR FEEDING BATCH MIXTURES TO FURNACES

Application filed April 12, 1928. Serial No. 269,447.

The present invention relates to batch feeders and more especially to a device of that type in which the glass batch is continuously and automatically fed to the melting compartment of the furnace.

It is the usual practice in feeding the glass batch to continuous tanks to employ an attendant, and under such circumstances the material is supposedly charged into the furnace at regular intervals. The proper time for placing the charge in the furnace is often overlooked by the attendant, however, and this necessitates the feeding of a larger charge at a later time. This method of feeding is objectionable because the level of the glass in the tank is allowed to vary over relatively wide limits and thus gives rise to many troubles which will be readily apparent to those skilled in the art.

It is an object of the present invention to entirely eliminate the foregoing objectionable features in the feeding of the glass batch to the furnace by providing means by which a relatively small amount of the batch mixture is fed to the furnace continuously.

A further object of the invention resides in the provision of a batch feeder in which the batch is mechanically spread in a thin layer over the surface of the glass in the tank, thereby providing for a more ready assimilation of the mixture.

Another object of the invention consists in the design of a batch feeder which is simple and inexpensive in construction and which is durable and reliable in operation.

Another object of the invention consists in the provision of a novel method of feeding the batch mixture to the melting tank whereby the raw material is more readily assimilated by the molten glass and the refining process is thereby hastened and a more uniform refined product produced.

Other objects and advantages of the invention will be apparent from the following description when taken in connection with the accompanying drawings; in which Figure 1 is a side elevation of the complete apparatus disposed in operative relation with the dog house of a continuous glass furnace.

Figure 4 is a rear elevation of the apparatus.

Figure 5 is an enlarged sectional view of a portion of the hopper, feed trough and shovel; and Figure 6 is a detail of the operating cam.

Figure 1:
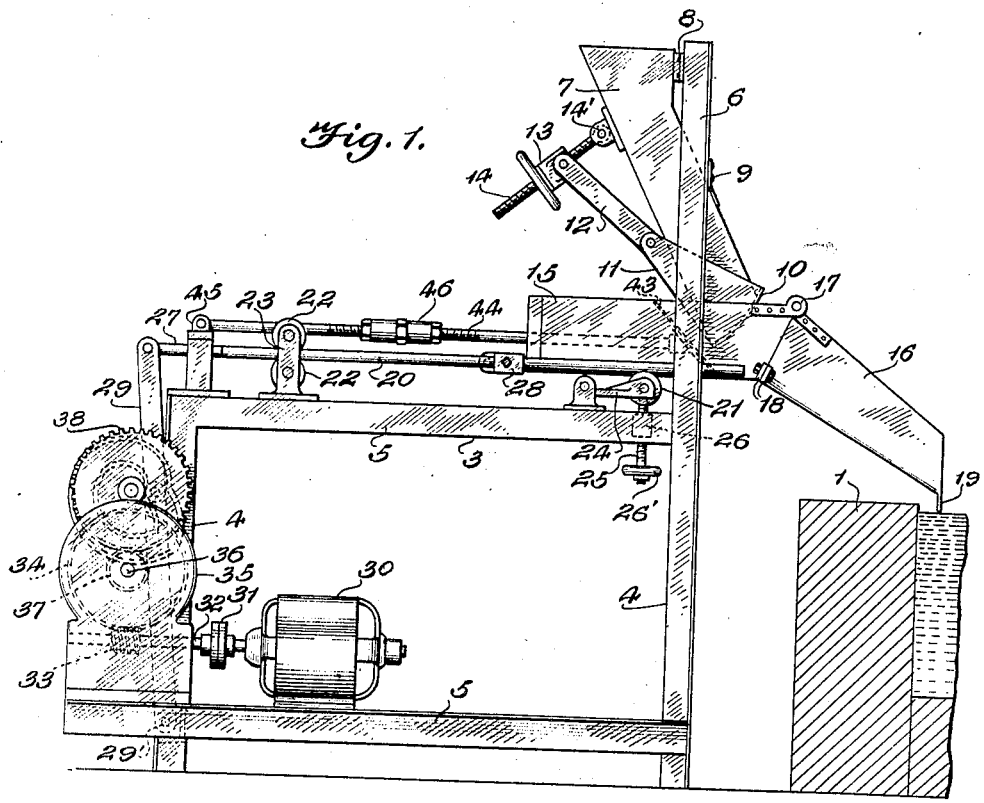
Figures 2, 3:
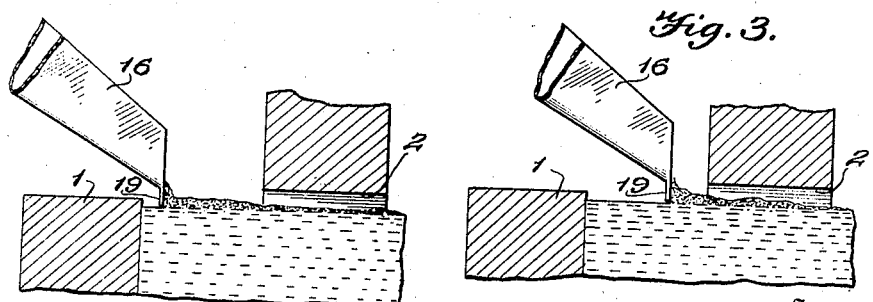
Figures 2 and 3 are detail views of a dog house showing various steps in the feeding of the charge by means of the present apparatus.

More specifically, the numeral 1 designates the rear end of a glass furnace of the continuous type and generally referred to as the dog house. Such structures usually include an arched aperture through which the charge is admitted to the interior of the melting tank and such aperture is here indicated by the numeral 2.

The feeder as disclosed in the present embodiment of the invention is built as a mobile unit, and the framework which is designated generally by the numeral 3 may be mounted on rollers if found desirable. This framework is preferably composed of the vertically disposed legs 4 of angle iron or the like, and the horizontal brace bars 5. The legs or uprights 4 adjacent the melting tank 1 are provided with extensions 6 which form a support for a hopper 7. This hopper 7 is suitably secured to the extensions 6 as indicated by numerals 8 and 9, and receives the batch through its open upper end from a batch bin (not shown). The lower end of the hopper 7 is provided with a closure or gate 10 pivoted by means of its arms 11 to the rear wall of the hopper or other fixed support on the frame. Operatively associated with the pivot of the gate 10 is an arm 12 which has its opposite end pivotally connected with a swivel nut 13 mounted on the screw 14. This screw 14 is pivotally connected at 14' to the rear wall of hopper 7, thereby allowing a swinging movement of the screw as the nut 13 is adjusted lengthwise thereof. By this construction it will be apparent that the gate 10 may be readily moved to closed position or adjusted to various open positions thus regulating the quantity of material passing through the hopper per unit of time.

Reciprocably mounted on the frame 3 so as to slide back and forth below the hopper 7 is a chute which comprises a horizontally disposed trough portion 15 and an inclined chute portion 16. The chute portion 16 is hinged to the forward end of the trough 15 by means of hinge pintles 17 so that the chute may be swung upwardly away from the heat of the furnace when not in use. Lugs 18 are provided on the lower adjacent edges of the trough and chute portions whereby these parts may be rigidly connected when in use. Furthermore, the lower end of the inclined chute portion is provided with a pusher bar 19, integral or otherwise, the operation of which will be described hereinafter.

The combined trough and chute 15–16, which is referred to in the appended claims as a chute, is mounted on the forward ends of two parallel rods 20 and is preferably connected thereto by spot welding or the like. These rods 20 are supported and guided at their front and rear ends by means of the rollers or sheave wheels 21 and 22 respectively. The wheels 22 are mounted in bearings 23 and it will be noted that two of these wheels are provided for each rod 20, one above and one below the same, so as to restrict the movements of the rods to a substantially horizontal plane. The forward rollers or wheels 21 are mounted on pivoted or hinged bearings 24 which may be raised or lowered by means of the screws 25. These screws are threaded through nuts 26 fixed to the frame, and have their upper ends in engagement with the bearing members 24. Obviously, these bearing members 24 could be rigidly connected if desired and thus raised or lowered by the operation of a single screw 25. A hand wheel 26' is provided for facilitating the operation of the bearings 24, and it will be apparent that through their operation or adjustment the vertical position of the chute portion 16 and pusher 19 with respect to the melting tank 1 may be varied at will.

As heretofore mentioned, the chute 15—16 when in operation, is intended to be reciprocated back and forth below the bottom of hopper 7 and to this end I provide a connecting rod 27 which is pivotally connected at its forward end to a crosshead 28 carried by the rods 20. The opposite or rear end of the connecting rod 27 is pivotally connected to a lever 29 which has its lower end pivotally mounted on the frame 3 as indicated by numeral 29'. For imparting an oscillating motion to the lever 29 and thereby reciprocating the chute 15–16, I provide a conventional type of variable speed motor 30 which is mounted on the base of the frame 3. The rotor shaft of the motor 30 is coupled, as indicated by numeral 31, with a worm shaft 32 which carries a worm 33. This worm 33 meshes with a worm wheel 34 in gear case 35, and the shaft 36 of this worm wheel also carries a pinion 37 meshing with gear wheel 38 fixed to shaft 39. Also keyed on shaft 39 is a positive cam 40 provided with a closed track 41 in which is located cam roller 42 mounted on the lever 29. By this train of gearing it will be observed that the rotation of the motor shaft will impart a reciprocating movement to the chute 15–16 and this movement will be preferably a slow forward stroke and a quick return stroke, by merely employing a cam of the proper design. It will also be apparent that the speed of operation of the chute may be varied by the resistances employed in the motors of the type indicated.

For the purpose of projecting the batch material from the trough portion 15 into the chute portion 16 of the apparatus, I provide what may be termed a shovel. This element which is designated by the numeral 43 is preferably of a shape conforming to the interior of the trough 15 and is mounted on the forward end of a rod 44. The opposite end of rod 44 is hinged to a bearing plate 45 mounted on the frame 3, and the rod itself is preferably provided with a turn-buckle 46 by means of which the effective length of rod 44 may be varied with a consequent adjustment of the position of the shovel 43. As will be obvious from the drawings, the shovel 43 has as its principal function to cause the batch material in the portion 15 of the chute to be discharged into the inclined portion 16 thereof as the chute is drawn rearwardly by means of the lever 29.

In the operation of the present embodiment of the invention, the apparatus is placed in proper position with respect to the dog house of a glass tank and in communication with a batch bin. The gate 10 is then adjusted to such position as to permit of an adequate flow of the batch mixture from the hopper 7 into the trough portion 15 of the chute 15—16. The motor is then set in operation at the desired speed. As the chute moves forward into the tank 1 a layer of the batch mixture is deposited upon the bottom of the trough 15 and as the movement of the parts is reversed, i. e., as the trough is drawn rearwardly by the lever 29 the shovel or scraper 43 will force the layer of batch mixture down the inclined chute 16 where it is spread in a thin uniform layer on the surface of the molten glass in the rear of the tank. As the chute again moves forward the above operation will be repeated and at the same time the pusher element 19 will travel along the surface of the molten glass and push forward into the furnace the layer of batch material which was spread on the surface of the glass during the previous cycle of operations of the apparatus. The apparatus is kept in continuous operation and thus affords a reliable means by which relatively small quantities of the batch mixture are spread in an even layer over the molten glass in the rear of the melting tank, and then pushed into the interior of the melting tank. A cycle of operations is completed during each revolution of the cam 40, and it is thus apparent that these thin layers of batch material are spread upon the surface of molten glass at frequently recurring intervals and then floated to the interior of the tank.

It is necessary of course, that the apparatus be adaptable to various installations of tanks as well as to varying conditions within the tanks, and it is for these reasons that the various adjustments heretofore mentioned are incorporated in the apparatus. For instance, if it is desired to change the vertical position of the pusher element 19 for any reason, such as to space it farther from the surface of the molten glass, it is only necessary to rotate the hand wheel 26' in the proper direction and to the desired extent. Should it be found desirable to vary the rate of flow of the material from the hopper 7 this may be accomplished by adjusting the nut 13 so as to move the gate 10 in the proper direction. Furthermore, the horizontal position of the shovel 43 may be varied by operating the turnbuckle 46 and the speed of operation of the feeder as a whole may be varied by varying the speed of operation of the variable speed motor 30. When operation of the feeder is discontinued for any reason the inclined chute portion 16 may be swung upwardly away from the heat of the furnace by merely removing the bolts passing through the lugs 18.

The method described herein for feeding the batch mixture to the melting tank is, of course, entirely independent of the particular apparatus disclosed, and consists essentially in first spreading the material in a thin layer on top of the molten glass and then floating it to the interior of the tank. By this method of feeding, the relatively small quantities of the batch mixture are presented in a thin layer which is exposed to the hot gases above and the molten glass beneath, thus greatly reducing the time required for melting and refining the raw material. Ebullitions due to the chemical reactions are therefore of shorter duration and the refining process is consequently hastened, so that a constant, uniformly refined, quality of molten glass is produced.

The movement of the thin layer of batch into the interior of the tank, at each cycle of operation of the feeder, is similar to the movement of a thin floating sheet of ice. That is, it floats or drifts bodily over the surface of the molten glass, without being forced up into a pile or forced down into the molten glass, or without any disturbance whatever, other than the gentle floating or drifting, bodily movement. In cases where the batch is forced into a pile, or is forced down into the glass, not only is the melting process retarded, but also the resulting glass is not of uniform quality. I find, however, that in the present method of feeding, the time of melting is considerably reduced, and the product is of uniformly high quality.

From the foregoing description taken in connection with the accompanying drawings, it will be apparent to those skilled in the art that I have devised a novel method and apparatus for feeding batch mixtures that provides for a continuous feed of the material to the melting tank in a thin, uniform layer; that the uncertainty of human labor as a factor in the charging process is eliminated; that the refining process is hastened and a uniform quality of refined glass of constant head is provided; and that the apparatus is susceptible to adjustments whereby it may be adapted to changing conditions within the tank as well as to various installations of tanks.

In accordance with the patent statutes I have described herein what I now believe to be the preferred embodiment of the invention, but it is to be noted that the present disclosure is subject to various changes and modifications without departing from the spirit of the invention.

What I claim as new and desire to secure by Letters Patent is:

1. A batch feeder including a frame, a reciprocably mounted chute on said frame, means for reciprocating said chute, and a pusher element carried by the forward end of the chute.

2. A batch feeder including a frame, a reciprocably mounted chute on said frame, means for intermittently discharging material from the chute to a furnace, and a pusher element carried by the forward end of the chute.

3. A batch feeder including a frame, a reciprocably mounted chute on said frame, a hopper for continuously feeding material to said chute, means for intermittently discharging material from the chute to a furnace and a pusher element associated with the forward end of the chute.

4. A batch feeder including a frame, a chute reciprocably mounted on said frame, a shovel positioned within said chute and fixedly connected to said frame, means for adjusting the horizontal position of said shovel, and means for continuously feeding material to said chute.

5. A batch feeder including a frame, a chute reciprocably mounted on said frame, a shovel positioned within said chute and fixedly connected to said frame, means for continuously feeding material to said chute, and a pusher element carried by said chute.

6. A batch feeder including a frame, a chute reciprocably mounted on said frame, a rod connected to said frame, a shovel mounted on said rod and positioned in said chute, a turnbuckle for varying the length of said rod, and means for reciprocating said chute.

7. A batch feeder including a frame, a chute reciprocably mounted on said frame, a rod connected to said frame, a shovel mounted on said rod and positioned in said chute, and a pusher element carried by said chute.

8. A batch feeder including a frame, a chute reciprocably mounted on said frame, a pusher element carried by the forward end of said chute, and means for vertically adjusting said chute.

9. A batch feeder including a frame, a chute reciprocably mounted on said frame, said chute including a horizontal portion and an inclined portion pivotally connected thereto, and a pusher element carried by the free end of said inclined portion.

10. A batch feeder including a frame, a chute reciprocably mounted on said frame, means for feeding batch material to the chute as the latter moves forwardly, and means for discharging the material from the chute as the latter moves rearwardly.

11. The method of feeding the glass batch to a glass furnace, which consists in periodically spreading a charge of the batch mixture on the surface of the molten glass in a thin layer, and causing the layer to float bodily forward in the furnace.

12. The method of feeding the glass batch to a glass furnace, which consists in periodically spreading a thin layer of the batch mixture on the surface of the glass, and moving said layer forward in the furnace without disturbing its uniform character.

13. The method of feeding the glass batch to a glass furnace, which consists in periodically spreading a thin layer of the batch on the surface of the glass, and gently floating the layer bodily forward in the furnace, without disturbing its uniform character.

14. A batch feeder for glass furnace including a chute movable back and forth over the surface of the glass, means for spreading the batch on the glass in a thin even layer as the chute moves rearwardly, and means floating the layer bodily forward into the furnace as the chute moves forwardly.

ROBERT GOOD.